United States Patent
Staub et al.

(10) Patent No.: US 6,890,470 B2
(45) Date of Patent: May 10, 2005

(54) METHOD FOR PRODUCING A FIBER COMPOSITE STRUCTURAL COMPONENT

(75) Inventors: Martin Staub, Hamburg (DE); Tim Leeraar, Buxtehude (DE); Juergen Filsinger, Aying (DE); Andreas Gessler, Haar (DE)

(73) Assignee: Airbus Deutschland GmbH, Hamburg (DE)

( * ) Notice: Subject to any disclaimer, the term of this patent is extended or adjusted under 35 U.S.C. 154(b) by 105 days.

(21) Appl. No.: 10/385,288

(22) Filed: Mar. 10, 2003

(65) Prior Publication Data

US 2003/0178738 A1 Sep. 25, 2003

(30) Foreign Application Priority Data

Mar. 9, 2002 (DE) ............................................ 102 10 517

(51) Int. Cl.[7] ........................ B29C 70/48; B29C 57/04
(52) U.S. Cl. .................. 264/255; 264/257; 264/258; 264/313; 264/314; 264/317; 264/324; 156/169; 156/172; 156/173; 156/175; 156/183; 156/194; 156/198
(58) Field of Search ................................. 264/255, 257, 264/258, 313, 314, 317; 156/169, 172, 173, 175, 182, 183, 184, 194, 198

(56) References Cited

U.S. PATENT DOCUMENTS

| | | | | |
|---|---|---|---|---|
| 4,279,856 A | * | 7/1981 | Vente et al. ................ | 264/313 |
| 4,341,005 A | * | 7/1982 | Oscarsson .................... | 29/411 |
| 4,675,061 A | * | 6/1987 | Mead ........................... | 156/155 |
| 4,900,487 A | * | 2/1990 | Lalloz et al. ............... | 264/45.2 |
| 5,125,993 A | * | 6/1992 | Principe .................... | 156/155 |
| 5,176,864 A | * | 1/1993 | Bates et al. ................ | 264/137 |
| 5,516,384 A | * | 5/1996 | Mossbeck .................... | 156/194 |
| 6,086,814 A | * | 7/2000 | Krenkel et al. ............. | 264/610 |
| 6,761,847 B2 | * | 7/2004 | Meggiolan .................. | 264/257 |

FOREIGN PATENT DOCUMENTS

| | | | |
|---|---|---|---|
| DE | 3910733 | | 10/1990 |
| JP | 62-207633 | * | 9/1987 |

* cited by examiner

Primary Examiner—Stefan Staicovici
(74) Attorney, Agent, or Firm—W. F. Fasse; W. G. Fasse

(57) ABSTRACT

A fiber composite structural component such as a fitting, bracket, mounting or the like is produced by applying fiber material such as fiber threads or fiber yarns in an automatic circular weaving operation to a core that has at least two sections, to form a fiber material body (6). One core section is removed from the fiber material body when the weaving is completed. The body is then deformed in a mold that has the contour of the finished structural component with at least one mold core section still in the fiber material body. The deformed configuration of the structural component is then impregnated in an RTM device with a resin and hardener followed by curing. Reinforcements may be inserted or secured to the fiber material body prior to the impregnated and curing step.

12 Claims, 2 Drawing Sheets

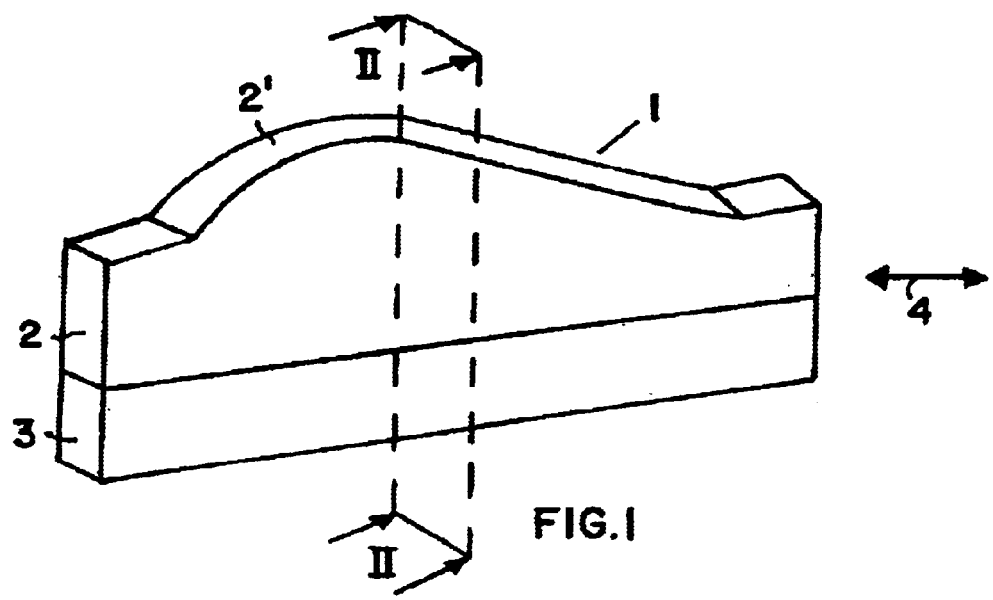
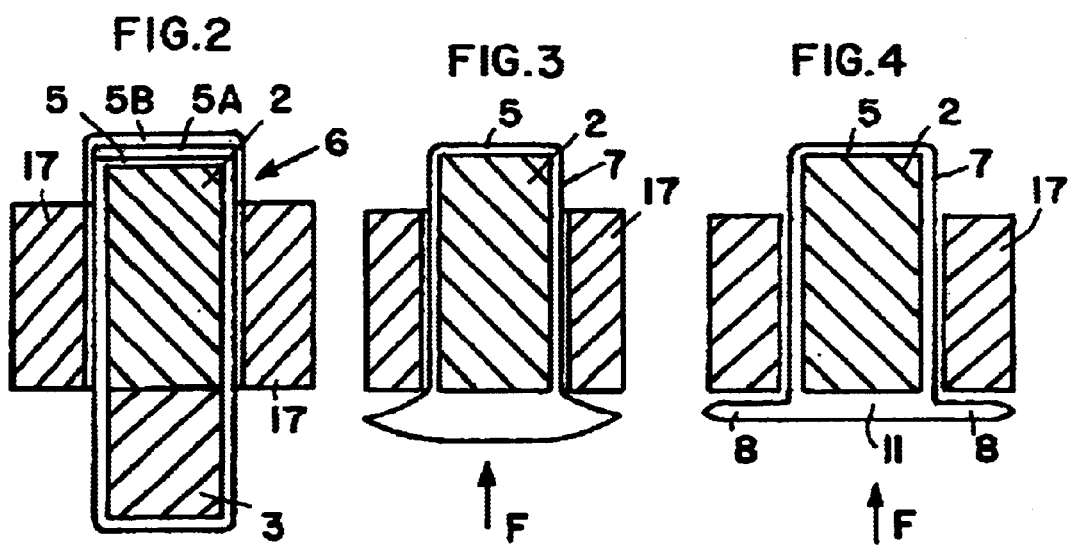

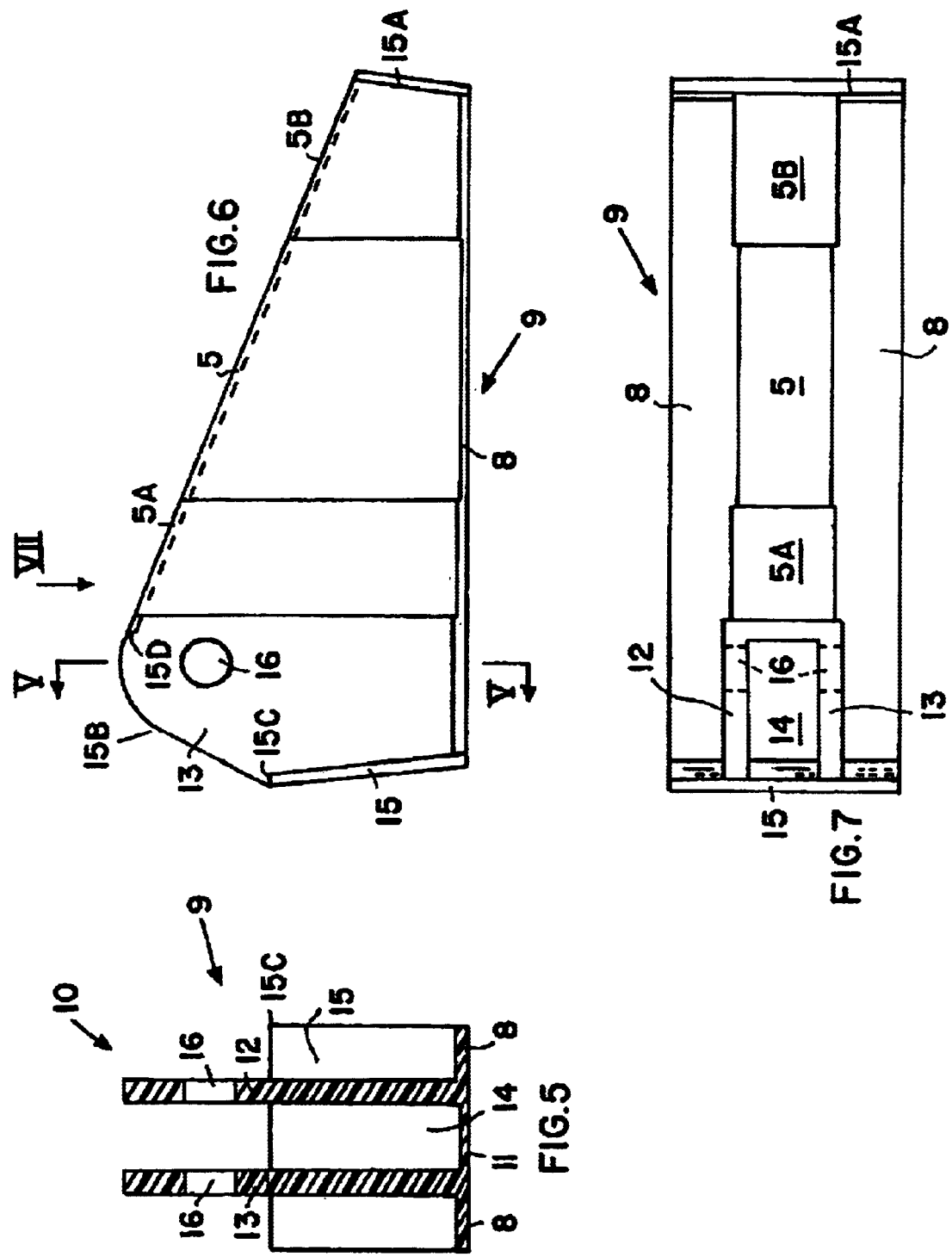

METHOD FOR PRODUCING A FIBER
COMPOSITE STRUCTURAL COMPONENT

PRIORITY CLAIM

This application is based on and claims the priority under 35 U.S.C. §119 of German Patent Application 102 10 517.0, filed on Mar. 9, 2002, the entire disclosure of which is incorporated herein by reference.

FIELD OF THE INVENTION

The invention relates to a method for producing a structural component by using fiber composite construction features. Such structural components are preferably used as so-called hardware in the aircraft construction field.

BACKGROUND INFORMATION

It is known to produce fiber composite components by using resin transfer molding techniques also known as RTM method. According to the RTM method a prefabricated semi-finished product or article is inserted into a mold, which is then evacuated. The semi-finished product is impregnated or saturated by a resin hardener mixture that is introduced into the mold. Thereafter, the pressure and temperature in the mold is increased for curing the semi-finished product into the finished structural component.

Another conventional production of structural components employing fiber composite construction features involves the production of fiber fabric layers which are then cut to a precise measure, impregnated with resin and then inserted into a jig or mold which is enveloped or encased together with the preassembled preimpregnated fiber fabric layers and the resulting package is then inserted into an autoclave for curing. Depending on the intended use of the structural component some after-treatment may be required for fiber composite components that have been produced by the just described molding operations. Such after-treatment may involve machining, drilling or the like. It is not the purpose of the invention to avoid such after-treatment procedures.

OBJECTS OF THE INVENTION

In view of the foregoing it is the aim of the invention to achieve the following objects singly or in combination:

- to produce a fiber composite structural component, particularly a lightweight component suitable for use in aircraft construction, by employing automated procedures to a larger extent than was possible heretofore;
- to avoid or at least minimize the need for manual steps in the production sequence;
- to combine so-called resin transfer molding techniques with an automated round weaving or hose weaving technique for the production of a fiber material body as a semi-finished product;
- to use a mold core that has at least two core sections, one of which can be removed from the semi-finished product while the other sections will be removed from the finished product; and
- to make the mold core of a low melting material that preferably can be recovered and used repeated while still being able in its mold core form to closely resemble the final configuration or contours of the fiber composite structural component.

SUMMARY OF THE INVENTION

The above objects have been achieved according to the invention by a method for manufacturing a fiber composite structural component having a given contour by using fiber composite construction features, whereby the method is performed by the following sequence of steps. First a mold core is provided or constructed to have at least two separable core sections which together have a mold core contour or configuration that closely resembles the given contour of the finished fiber composite structural component. This mold core is then used in an automatic circular or hose weaving operation in which a fiber material is circularly woven around the mold core to form a fiber material body which at this point is not yet impregnated with resin and hardener. Next, one of the separable cross-sections is removed out of the fiber material body which is then inserted into a mold having the given contour of the fiber composite structural component. At this point one of the separable core sections is still in the fiber material body. In the mold the given contour of the fiber composite structural component is impressed on the fiber material body to form a semi-finished product. The semi-finished product is then impregnated with a resin and binder or hardener mixture. The impregnation is then followed by curing to produce the finished fiber composite structural component. As the last step the other core section is removed from the structural component. Preferably, but not necessarily, the impregnation and curing takes place in a resin transfer molding apparatus.

Substantial advantages of the method according to the invention are seen in that the production time has been substantially reduced compared to conventional methods, particularly due to the automatic round or circular weaving for producing the fiber material body. Further, the highly accurate reproducibility of the contours of the finished structural component which reduces rejects, and the high production rate are significant economical advantages that are combined with a low weight of the structural component made of fiber composite material as compared to corresponding components of aluminum. Moreover, the material strength and thus the structural strength of the components produced according to the invention reduces the effort and expense for maintenance procedures for aircraft equipped with such components.

BRIEF DESCRIPTION OF THE DRAWINGS

In order that the invention may be clearly understood, it will now be described in connection with example embodiments, with reference to the accompanying drawings, wherein:

FIG. 1 illustrates a perspective view of a mold core having two core sections that together closely resemble or approximate the contour of the finished product;

FIG. 2 illustrates a sectional view along section plane II—II in FIG. 1 with both mold core sections still in the fiber material body which in turn is inserted in a jig or mold only shown symbolically;

FIG. 3 shows a section similar to that of FIG. 2, however with the lower mold core section removed and the empty fiber material body portion partially deformed;

FIG. 4 is a sectional view similar to that of FIG. 3 with the empty portion of the fiber material body still further deformed to produce lateral mounting flanges;

FIG. 5 is a sectional view along section plane V—V in FIG. 6;

FIG. 6 is a side view of a fiber composite structural component produced according to the invention; and FIG. 7 is a top plan view in the direction of the arrow VII in FIG. 6.

DETAILED DESCRIPTION OF A PREFERRED EXAMPLE EMBODIMENT AND OF THE BEST MODE OF THE INVENTION

FIG. 1 shows a mold core 1 which comprises at least two core sections 2 and 3. The mold core 1 is separately produced to have a contour 2' that closely resembles the contour or configuration of the fiber composite structural component to be produced according to the invention. The mold core 1, or rather the mold core sections 2 and 3, are made of a low melting material such as metal alloys which retain their dimensional and shape stability at temperatures up to about 120° C. and which tend to melt at temperatures that are used for the curing, for example 180° C. Wax or wax compositions may also be suitable for the present purposes. According to the invention the mold core 1 is surrounded by fiber material in an automatic round, circular, or hose weaving operation, whereby the weaving proceeds back and forth along the length of the core 1 as indicated by the double arrow 4. The automatic winding or weaving operation is performed so that the end faces of the mold core 1 remain open as will be described in more detail below.

FIG. 2 shows that the fiber material 5 in the form of at least one woven ply or prefabricated layer surrounds both core sections 2 and 3 so that the top surface, the side surfaces and the bottom surface of the mold core are covered with the fiber material 5 to form a fiber material body 6 which is inserted into a jig or mold 17 so that the lower mold core section 3 is not inside the opening or cavity of the mold, whereby the core section 3 can be removed from the fiber material body 6. The number of layers or plies of fiber material 5 will be selected in accordance with the strength requirements to be met by the structural component to be produced. Reinforcing members 5A, for example in the form of prefabricated layers 5A, preferably made of fiber composite materials or fiber composite woven fabrics, are attached to the fiber material 5 along the top, bottom and/or side surfaces of the body 6. For simplicity's sake only one reinforcing layer 5A is shown in FIG. 2. Normally a plurality of such layers, preferably also made of fiber composite materials or fabrics, will be attached to the fiber material body 6. These reinforcing members 5A may be attached by sewing or stitching or any other suitable attachment method, e.g. automatic embroidering.

Another way of securing reinforcing members 5A in the form of prefabricated layers is performed as follows. First one or more fiber material plies are woven onto the mold core 1. Then, a reinforcing layer or layers are applied followed by weaving at least one additional fiber material ply or plies 5B onto the reinforcing layers. The additional plies 5B hold the reinforcing layer or layers in place. The application of all plies and reinforcement layers of fiber material, preferably carbon fiber material can also be accomplished by the above mentioned automatic round or circular weaving operation whereby reinforced portions of the fiber material body 6 carry more plies than other body portions. However, preferably the reinforcing layers are produced separately in a mass production operation.

FIG. 3 shows that the lower core section 3 has been removed following the completion of the fiber material body 6 so that a hollow space is formed in the lower end of the fiber material body 6. The fiber material body 6 is still held in the jig or mold 17 and a force F is applied to push the empty portion of the fiber material body 6 against the downwardly facing surfaces of the jig or mold 17. As shown in FIG. 3 the empty portion has not yet been completely pushed against the mold 17 thus illustrating an intermediate position in the sequence for manufacturing a semi-finished product 7.

FIG. 4 shows the completion of the semi-finished product 7 in which the previously empty portion of the fiber material body 6 has been completely pressed against the jig or mold 17 by the force F to form mounting flanges 8. These mounting flanges 8 are particularly suitable for connection to the primary structure of an aircraft such as the frame of the aircraft body.

FIGS. 5, 6 and 7 illustrate a modification of the present fiber structural component 9. In the modification reinforcement layer or layers 5B are so dimensioned and positioned that portions 15, 15A of the reinforcement layer or layers protrude from the respective facing ends of the finished fiber structural component 9. Prior to inserting the semi-finished product 7 into a resin transfer molding apparatus, the protruding portions 15, 15A are folded against the open ends of the semi-finished product 7. The protruding portion 15A completely closes the rear end of the semi-finished intermediate product 7 as shown at 15A in FIG. 6. The protruding portion 15 has such a length that an opening 15B into a hollow space 14 between the component side walls 12 and 13 is formed. The opening 15B extends from an upper edge 15C of the folded portion 15 to an upper edge 15D of the top wall of the finished component 9. Thus, the core section 2 that initially remained in the semi-finished product 7 can be removed after completion of the component 9, for example by melting the material of which the core is made out of the finished component 9. This melting of the core section 2 may take place simultaneously with the curing.

FIG. 5 shows that all mold core sections 2 and 3 have already been removed from the product 9. The impregnated and cured side walls 12, 13 of the component form together with the mounting flanges 8 and the bottom wall 11 an upside down double T-configuration 10 which is connectable along the flanges 8 to aircraft frame elements. The end wall frame portions 15 and 15A are well suited for providing a surface area connection to, for example, the outer aircraft body skin by an adhesive bonding, riveting or the like.

When the mounting flanges 8 of the intermediate product 7 are completed, the semi-finished product 7 will be inserted into a resin transfer molding apparatus in which the product 7 is impregnated by a conventional resin hardener mixture and then cured, preferably at a temperature which enhances the curing and simultaneously melts out the core section 2, for example at about 180° C., whereby the material of the core section 2 can run out of the opening 15B. However, the curing can also take place a higher temperature, whereby the core section 2 is melted out of the cured component in a separate step. Once the low melting core material has been completely removed from the space 14, the component 9 may be subjected to after-treatments, such as milling, drilling, insertion of bushings and so forth. For example holes 16 may be drilled through the side walls 12 and 13 for passing screws or rivets through these holes 16. The left-hand ends of the side walls 12 and 13 form together a fork for receiving a structural member not shown.

FIGS. 6 and 7 further show where reinforcing layers 5A and 5B have been placed in addition to the woven plies 5, whereby the side walls and the top and bottom walls surfaces of the component 9 may have thinner or thicker portions as indicated by the steps or corners seen in FIGS. 6 and 7. Thus, according to the invention the wall thickness of the component can be selected in accordance with the load requirements that may be higher toward the ends of the component 9 compared to the center of the component 9.

An important advantage of the invention is seen in that a conventional circular or hose weaving automat can be used for producing the fiber material body 6 and that the reinforcing layers 5A can be separately produced on automatic looms and then secured into or to the woven fiber material body 6. A circular or hose weaving automat includes a manipulation system to be operated by an operator and an industrial robot which carries the mold core 1 functioning as a weaving core. Such weaving cores can have complex three-dimensional configurations which means that hardware components having complex three-dimensional configurations can be made according to the invention. Thus the fiber material body 6 produced by such a robot weaving loom can have a preliminary contour which closely resembles the final desired configuration or contour of the hardware component 9. The final contour is achieved by deforming the body 6 in a mold as described above and by additional stitching if desired. Thus, any configuration or contour of the structural component 9 can be fashioned. For example, gusset components or elements for a framework can be made as well and easy as hollow bodies, whereby the weaving core 1 is easily melted out in sections at different stages of the manufacturing sequence. Additionally it is possible to stitch together separately woven fiber material bodies, whereby substantially any configuration or contour of the structural component 9 can be made.

Further, during the circular weaving operation the thickness of the fiber material and the thickness of the individual plies can be selected as desired. This selection also applies to the thickness of separately produced reinforcement layers. For example, a woven ply can have a thickness of 1.2 mm while a reinforcement layer may have a thickness of 0.25 mm. Additionally, it is possible to select the ratio of the fiber material volume relative to the open spaces in the fiber material body 6. These open spaces depend on the tightness of the weaving which can be selected by the loom operator. Thus, the fiber volume may be about 60% while the open spaces volume in which the impregnating resin is received, amount to about 40%. In the given example the ply thickness of 1.2 mm may be achieved, for example, by using so-called inlay threads or yarns having a thickness of 0.4 mm and braiding yarns or threads having a thickness of 0.8 mm. These threads or yarns have a ± orientation or direction. The direction or orientation of the fiber threads or yarns will differ within the woven body. For example, the braiding yarns or threads may start at an orientation of ±30° while ending at an orientation of ±60 to 70°. Even the inlay yarns which normally have a 0° orientation may have an orientation at a variable angle.

Carbon fibers are preferably used for the present purposes in the form of CFC materials. However, other fiber materials may be used as well if such other fibers, for example in the form of GFC materials satisfy the strength requirements that must be met by the structural components. Further, conventional resins and hardeners are used in practicing the present method.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for manufacturing a fiber composite structural component having a given contour by using fiber composite construction features, said method comprising the following steps:

a) using a mold core (1) having at least two separable core sections (2, 3) which together have a mold core contour closely resembling said given contour of said fiber composite structural component, b) performing an automatic circular weaving operation, thereby applying a fiber material (5) around said mold core (1) to form a fiber material body (6), c) removing one of said separable core sections (3) out of said fiber material body (6) to provide an empty portion of said fiber material body, d) shaping said fiber material body (6) including said empty portion with the other separable core section (2) still in said fiber material body (6), into said given contour to form a semi-finished product (7), e) impregnating said semi-finished product with a resin matrix material and curing said impregnated semi-finished product to produce said fiber composite structural component, and f) removing the other core section (2) from said structural component.

2. The method of claim 1, wherein said impregnating and curing is performed in an RTM device.

3. The method of claim 1, further comprising performing said shaping step (d) so that said empty portion is shaped into mounting flanges (8).

4. The method of claim 1, further comprising the following steps:

a) stopping said automatic circular weaving operation when a predetermined number of plies has been applied to said mold core (1), and b) securing at least one separately produced reinforcing member to said fiber material body (6) prior to said impregnating and curing step.

5. The method of claim 4, further comprising using as said at least one reinforcing member a prefabricated fiber material layer or fiber material fabric.

6. The method of claim 3, further comprising performing said shaping step (d) prior to said impregnating and curing step, by folding and pressing said empty portion of said fiber material body (6) against fixed surfaces of a jig or mold (17) to form said mounting flanges (8) on said fiber material body (6).

7. The method of claim 5, further comprising dimensioning said fiber material layer or fiber material fabric to protrude partially from said fiber material body (6) and, prior to said impregnating and curing step, folding a partially protruding portion (15, 15A) of said fiber material layer or fiber material fabric against said fiber material body (6) to provide at least one reinforced connector surface area.

8. The method of claim 5, comprising folding said partially protruding portion (15, 15A) against at least one end face of said fiber material body (6).

9. The method of claim 5, comprising folding said partially protruding portion against at least one side wall of said fiber material body (6).

10. The method of claim 1, further comprising performing, following said curing, an after treatment.

11. The method of claim 1, further comprising the following steps:

a) temporarily stopping said automatic circular weaving operation when a given number of plies has been applied to said mold core, b) attaching or placing at least one separately produced reinforcing member to said fiber material body (6), and c) continuing said automatic circular weaving operation for securing said at least one reinforcing member in said fiber material body (6).

12. The method of claim 11, further comprising using as said reinforcing member separately woven fiber fabric.

* * * * *